US010174760B2

(12) United States Patent
Brookes et al.

(10) Patent No.: US 10,174,760 B2
(45) Date of Patent: Jan. 8, 2019

(54) GEAR PUMP

(71) Applicant: ROLLS-ROYCE plc, London (GB)

(72) Inventors: David Brookes, Derby (GB); Martin K. Yates, Derby (GB)

(73) Assignee: ROLLS-ROYCE PLC, London (GB)

(*) Notice: Subject to any disclaimer, the term of this patent is extended or adjusted under 35 U.S.C. 154(b) by 167 days.

(21) Appl. No.: 15/255,945

(22) Filed: Sep. 2, 2016

(65) Prior Publication Data
US 2017/0184095 A1    Jun. 29, 2017

(30) Foreign Application Priority Data

Oct. 21, 2015  (GB) .................................. 1518619.0

(51) Int. Cl.
*F04C 14/28*    (2006.01)
*F04C 2/14*    (2006.01)
(Continued)

(52) U.S. Cl.
CPC .............. *F04C 14/08* (2013.01); *F02C 7/236* (2013.01); *F04C 2/08* (2013.01); *F04C 2/084* (2013.01); *F04C 2/102* (2013.01); *F04C 2/14* (2013.01); *F04C 11/008* (2013.01); *F04C 14/28* (2013.01); *F04C 15/008* (2013.01); *F04C 15/0096* (2013.01); *F04C 29/0085* (2013.01); *F04C 2210/1044* (2013.01); *F04C 2240/40* (2013.01); *F04C 2270/051* (2013.01)

(58) Field of Classification Search
CPC ........ F04C 2/086; F04C 15/008; F04C 14/08; F04C 14/28; F04C 2/14; F04C 2/084; F04C 2/102; F04C 2/08; F04C 15/0096; F04C 11/008; F04C 29/0085; F04C 2270/051; F04C 2210/1044; F04C 2240/40; F02C 7/236
USPC ..................................... 417/212, 410.4, 354
See application file for complete search history.

(56) References Cited

U.S. PATENT DOCUMENTS 2,918,209 A * 12/1959 Schueller .............. F04C 18/126
417/338
5,271,719 A    12/1993 Abe et al.
(Continued)

FOREIGN PATENT DOCUMENTS

EP    0 585 911 A1    3/1994
EP    1 249 608 A1    10/2002
(Continued)

OTHER PUBLICATIONS

English Abstract of JP04178143A dated Jun. 25, 1992.*

*Primary Examiner* — Nathan C Zollinger
(74) *Attorney, Agent, or Firm* — Oliff PLC

(57) ABSTRACT

A gear pump has first and second meshing gears for pumping a fluid. The gear pump further has a first electrical motor having a first rotor, a first stator and first coil windings. The gear pump further has a second electrical motor having a second rotor, a second stator and second coil windings. The first rotor is operatively connected to the first gear and the second rotor is operatively connected to the second gear such that each gear is rotated by its respective rotor. The first and second coil windings are energized by respective and separate first and second electrical power circuits such that the first and second meshing gears can be driven independently of each other.

6 Claims, 3 Drawing Sheets

(51) Int. Cl.
  *F04C 14/08*   (2006.01)
  *F02C 7/236*   (2006.01)
  *F04C 29/00*   (2006.01)
  *F04C 2/08*    (2006.01)
  *F04C 2/10*    (2006.01)
  *F04C 11/00*   (2006.01)
  *F04C 15/00*   (2006.01)

(56) References Cited

U.S. PATENT DOCUMENTS

| | | | | |
|---|---|---|---|---|
| 5,767,635 | A * | 6/1998 | Steffens | F04C 28/08 318/41 |
| 5,814,913 | A * | 9/1998 | Ojima | F04C 28/08 310/112 |
| 6,481,975 | B1 * | 11/2002 | Pais | F04C 15/008 417/356 |
| 6,625,983 | B2 * | 9/2003 | Kawasaki | F16D 31/02 60/468 |
| 7,021,905 | B2 | 4/2006 | Torrey et al. | |
| 2001/0036415 | A1 * | 11/2001 | Pijanowski | F04C 15/008 417/410.4 |
| 2011/0103992 | A1 * | 5/2011 | Cully | F04C 2/14 418/144 |
| 2012/0260658 | A1 * | 10/2012 | Bader | F02C 7/236 60/734 |
| 2015/0247498 | A1 * | 9/2015 | Afshari | F04C 2/084 418/1 |
| 2016/0109133 | A1 | 4/2016 | Edwards et al. | |
| 2017/0204854 | A1 * | 7/2017 | Afshari | F04C 2/086 |

FOREIGN PATENT DOCUMENTS

| | | | | |
|---|---|---|---|---|
| GB | 2 123 089 | A | | 1/1984 |
| GB | 2123089 | A * | 1/1984 | F04C 15/008 |
| GB | 2523196 | A | | 8/2015 |
| JP | 04178143 | A * | 6/1992 | F04C 15/0061 |
| WO | 2015/131196 | A1 | | 9/2015 |
| WO | 2016/014715 | A1 | | 1/2016 |

* cited by examiner

GEAR PUMP

FIELD OF THE INVENTION

The present invention relates to a gear pump, and particularly, but not exclusively, to a high pressure gear pump of an aero-engine fuel pumping unit.

BACKGROUND

A typical fuel pumping unit for an aero-engine comprises a low pressure (LP) pump operable to draw fuel from a fuel tank, and supplying the fuel at boosted pressure to the inlet of a high pressure (HP) pump. The inter-stage flow between LP and HP pumps is typically used to cool engine lubrication oil in a fuel/oil heat exchanger.

Commonly, the LP pump comprises a centrifugal impeller pump whilst the HP pump comprises a positive displacement pump in the form of a twin pinion gear pump. The pumps are generally driven from a shaft on the engine accessory gearbox and therefore have a fixed speed relationship with engine running speed. A rotating seal is typically required to avoid leakage around the input drive shaft to the gear pump.

FIG. 1 shows schematically a conventional twin pinion gear arrangement with first 2 and second 4 pinion gears mounted on parallel first 6 and second 8 gear shafts, the gears meshing at region R.

A positive displacement pump, such as a gear pump, is typically configured to provide sufficient flow at the maximum take-off or the windmill-relight design points of an aero-engine. However, the pump generally only needs to provide a small fraction of this flow under normal operation, with the excess flow being re-circulated.

SUMMARY

It would be desirable to be able to vary the speed of a positive displacement gear pump during different parts of a flight cycle to reduce heat rejection into the fuel and also to reduce pump wear.

It would also be desirable to be able to avoid the need for a rotating seal around an input drive shaft to the gear pump.

Accordingly, in a first aspect, the present invention provides a gear pump having:

first and second meshing gears for pumping a fluid;
a first electrical motor having a first rotor, a first stator and first coil windings; and
a second electrical motor having a second rotor, a second stator and second coil windings;
wherein the first rotor is operatively connected to the first gear and the second rotor is operatively connected to the second gear such that each gear is rotated by its respective rotor; and
wherein the first and second coil windings are energised by respective and separate first and second electrical power circuits such that the first and second meshing gears can be driven independently of each other.

Advantageously, as the pump is driven by an electrical motor, pump speed can be varied independently of engine speed so that less flow has to be recirculated which in turn reduces the heating of the pumped fluid. This is of particular benefit in the context of an aero-engine fuel pump, as the fuel then has additional heat sink capability to cool other parts of the engine.

Moreover, not only can the electrical motors avoid the need for a rotating seal, but they can be integrated with other parts of the pump to form a compact pump arrangement.

Additionally, the pumped fluid can be used for cooling the motors.

In a second aspect, the present invention provides a fuel pumping unit for an aero-engine (such as a gas turbine engine), the unit having a low pressure pump and a high pressure pump, the low pressure pump supplying fuel at a raised pressure to the high pressure pump for onward supply to a fuel metering unit of the engine, wherein the high pressure pump is a pump according to the first aspect.

In a third aspect, the present invention provides an aero-engine (such as a gas turbine engine) having a fuel pumping unit according to the second aspect.

Optional features of the invention will now be set out. These are applicable singly or in any combination with any aspect of the invention.

Typically the first and second gears are pinion gears.

Typically, the gears are non-magnetic. Moreover the profiles of the teeth of the gears can be optimised for pumping low lubricity fluid such as fuel.

The electrical motors may be brushless electrical motors.

Conveniently, the first rotor and the first gear may be mounted, axially spaced from each other, on a first gear shaft, and the second rotor and the second gear may be mounted, axially spaced from each other, on a second gear shaft. The gear shafts can be parallel to each other.

Conveniently, the first and second rotors can be on the same side of the meshing gears. However, this does not exclude that the rotors can be on opposite sides of the meshing gears. Particularly when the rotor are on the same side, cores of the first and second stators can be formed as a unitary body, facilitating a more compact pump arrangement. However, this does not affect the separateness of the first and second coil windings and hence the independence of the gears.

The first and second electrical power circuits may each include a respective variable frequency motor drive. Each variable frequency motor drive typically comprises inverter power electronics.

The pump may be configured such that the electrical motors are cooled by a cooling flow formed from a flow of the pumped fluid.

The electrical motors may be fully immersed in the fluid. Locating the motors in a fuel flooded part of the pump helps to avoid a need for a rotating seal.

The pump may further have a control unit which controls the power provided by the first and second electrical power circuits to run the pump at different speeds. Such a control unit may further vary the relative amounts of power provided by the circuits so that varying amounts of mechanical power can be transferred between the gears. This allows a desired amount of gear-to-gear interface sealing to be attained. Also, if the motors or circuit of one of the gears fails or develops a fault, the control unit can run the pump by driving just the other gear, thereby improving redundancy in the pump. The control unit may further compare the power provided by the circuits with a reference power characteristic (e.g. power against pump speed) to monitor the health of the pump.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 1:
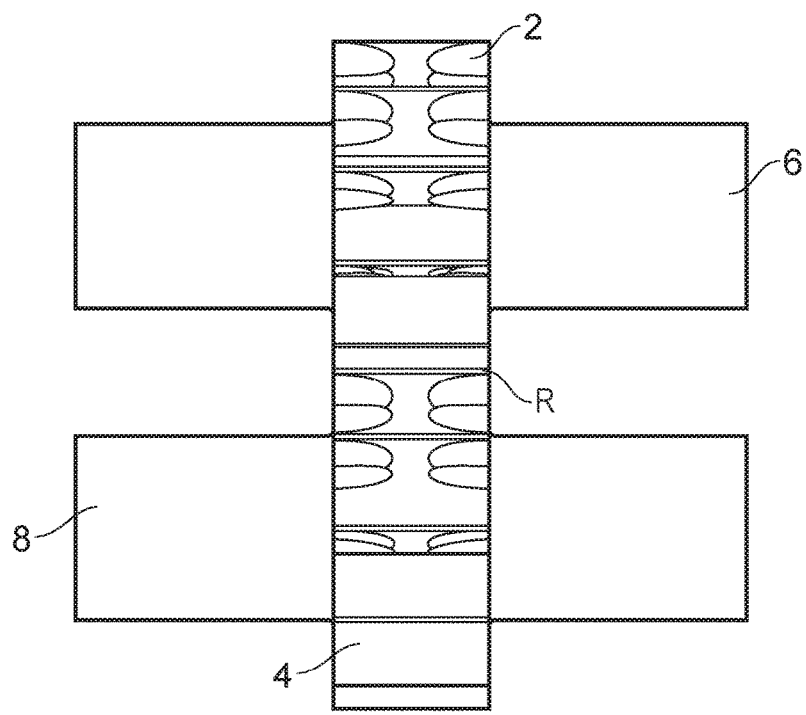
FIG. 1 shows schematically a conventional twin pinion gear arrangement.
Figure 2:
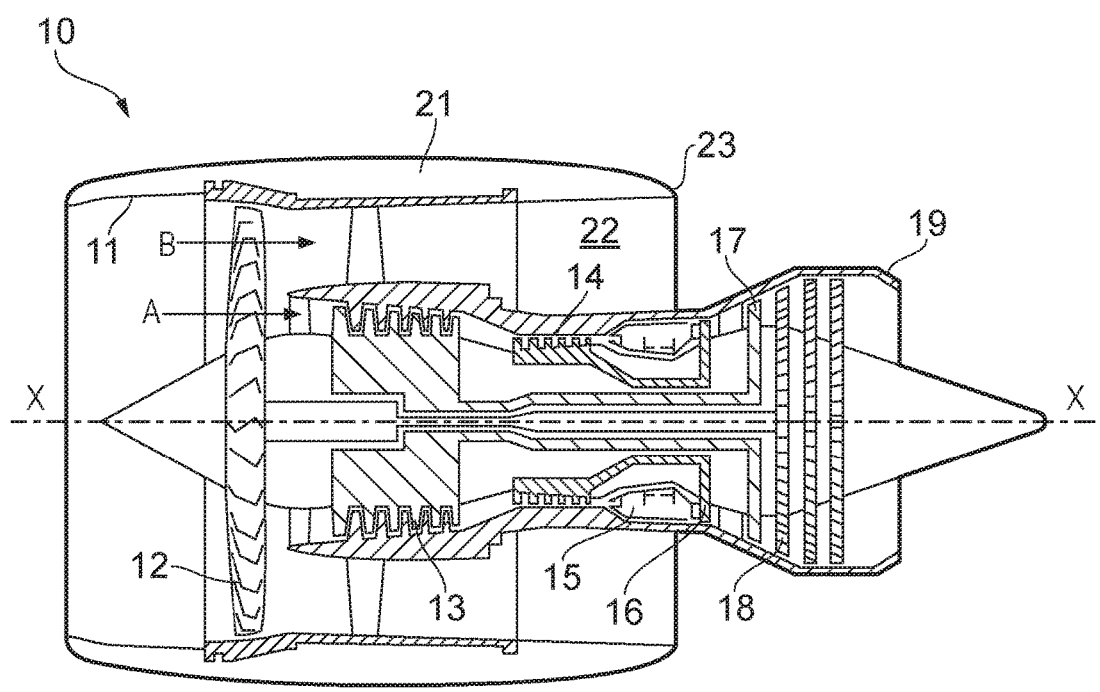
FIG. 2 shows a longitudinal cross-section through a ducted fan gas turbine engine.

With reference to FIG. 2, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

The engine has a fuel pumping unit (not shown in FIG. 2) which receives fuel from one or more local pumps associated with respective aircraft wing fuel tanks, and supplies pressurised fuel to a fuel metering unit of the engine. The metered fuel is then sent to the burners of the combustion equipment 15.

The pumping unit has an LP and an HP pump. The LP pump can be a centrifugal pump.

Figure 3:
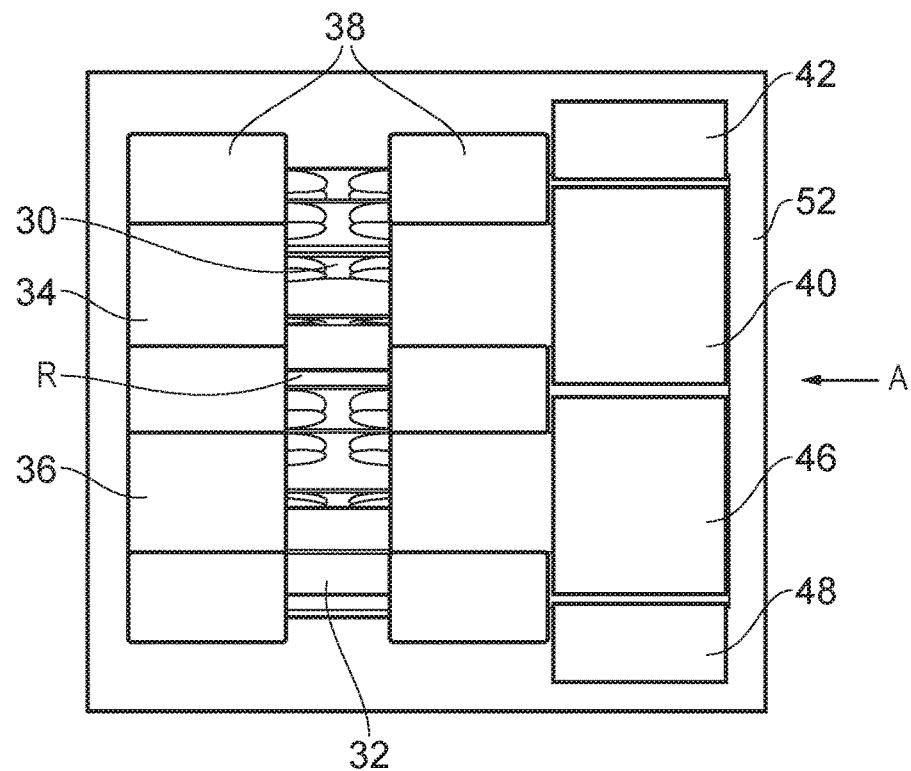
FIG. 3 shows schematically a cross-section of a twin pinion gear pump.
Figure 4:
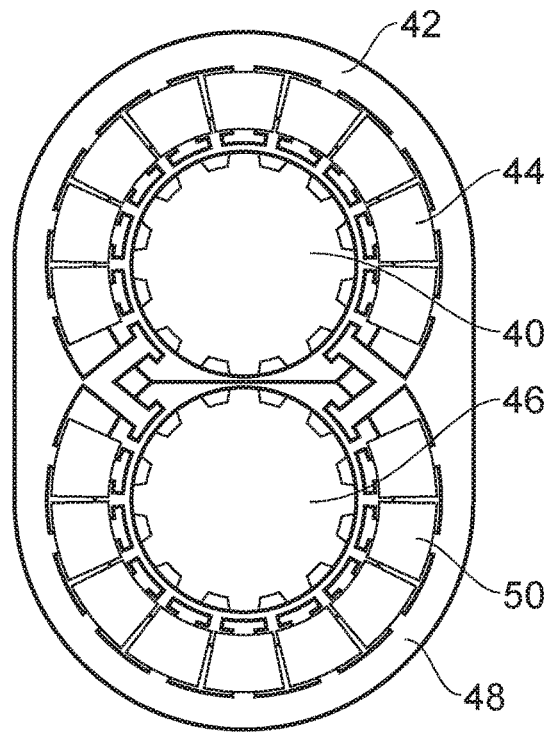
FIG. 4 shows schematically an example motor arrangement in an end view of the pump of FIG. 3 from direction A.

The HP pump, by contrast, can be a twin pinion gear pump, as shown schematically in the cross-section of FIG. 3. An example motor arrangement in an end view of the pump from direction A is then shown schematically in FIG. 4.

The HP pump has first 30 and second 32 non-magnetic, pinion gears respectively mounted on parallel first 34 and second 36 gear shafts, which are held in hydraulic journal bearing blocks 38. The gears mesh at region R. The first gear is driven by a first brushless electrical motor having a first rotor 40, a first stator 42 and first coil windings 44, and the second gear is driven by a second brushless electrical motor having a second rotor 46, a second stator 48 and second coil windings 50. The rotors 40, 46 are axially spaced from their respective pinion gears 30, 32 on their respective gear shafts 34, 36. A housing 52 surrounds the pinion gears 30, 32, shafts 34, 36 and electrical motors.

The two motors are on the same side of the meshing pinion gears 30, 32. This allows the stators 42, 48 to be formed as a unitary body in which a single stator iron is arranged in two arcs rather than fully surrounding each rotor, as shown best in FIG. 4. Nonetheless the coil windings 44, 50 are electrically separate.

The first 44 and second 50 coil windings are energised by respective and separate first and second electrical power circuits (not shown) e.g. comprising inverter power electronics. This allows the pinion gears 30, 32 to be driven independently of each other.

Thus no single fault should cause both gears to fail. In particular, if a motor phase winding(s) is not providing electrical power, due to e.g. failure of inverter power electronics or a failure within the motor, the pump can revert to a gear-meshing mechanical arrangement in which one gear is driven by the other gear. The drive requirements of the faulty motor-driven gear may be augmented mechanically via the remaining operational motor-driven gear. This provides a level of redundancy which is beneficial in an aero-engine fuel pump.

The profile of the gear teeth can be optimised for pumping low lubricity aero-engine fuel. With each of the pump gears independently driven, under normal operation, a fraction of mechanical power can be transferred between the two gears to attain a desired amount of gear-to-gear interface sealing. However, frictional losses and wear of the gear flanks can be reduced by keeping this transfer to a minimum.

The pump can have a control unit (not shown) which controls the power provided by the electrical power circuits to run the pump at different speeds. The pump speed can thus be varied independently of engine speed so that less flow has to be recirculated which in turn reduces the heating of the pumped fuel, which then has an enhanced heat sink capacity.

The control unit may further vary the balance of power provided via the two electrical motors so that an optimum amount of power is transferred mechanically via the gear teeth whilst a desired gear-to-gear interface sealing performance is attained. Moreover, as the pump is driven, the control unit can characterise the required amount of power against pump rotational speed. In this way, the control of the electrical power circuits can be used as a continuous (or periodic) monitor of the required power to the pump, with a change from the original characterisation indicating pump degradation. More generally, monitoring the power required to drive the pump at different speeds can be used to provide pump prognostics as an indicator of a change in the pumped fluid or mechanical degradation of the pump.

As well as the above advantages, the use of electrical motors to drive the pump facilitates a compact pump configuration, and avoids a need to provide a rotating seal to pass mechanical drive through the housing 52.

Moreover, the pump can avoid a need to seal the rotor ring from the impeller. Indeed, the electrical motor can be fully immersed in the pumped fuel. Indeed, the electrical motors may be fully immersed in the fluid.

Conveniently, the pump may be configured such that the electrical motors are cooled by a cooling flow formed from a flow of the pumped fuel. As the fuel is already at a raised pressure on entry into the pump, there should be no undissolved air within the fuel. Accordingly, the therefore the windings 44, 50 are not exposed to air, which reduces the possibility of electrical breakdown within the windings and avoids a need for them to be fully encapsulated.

Figure 5:
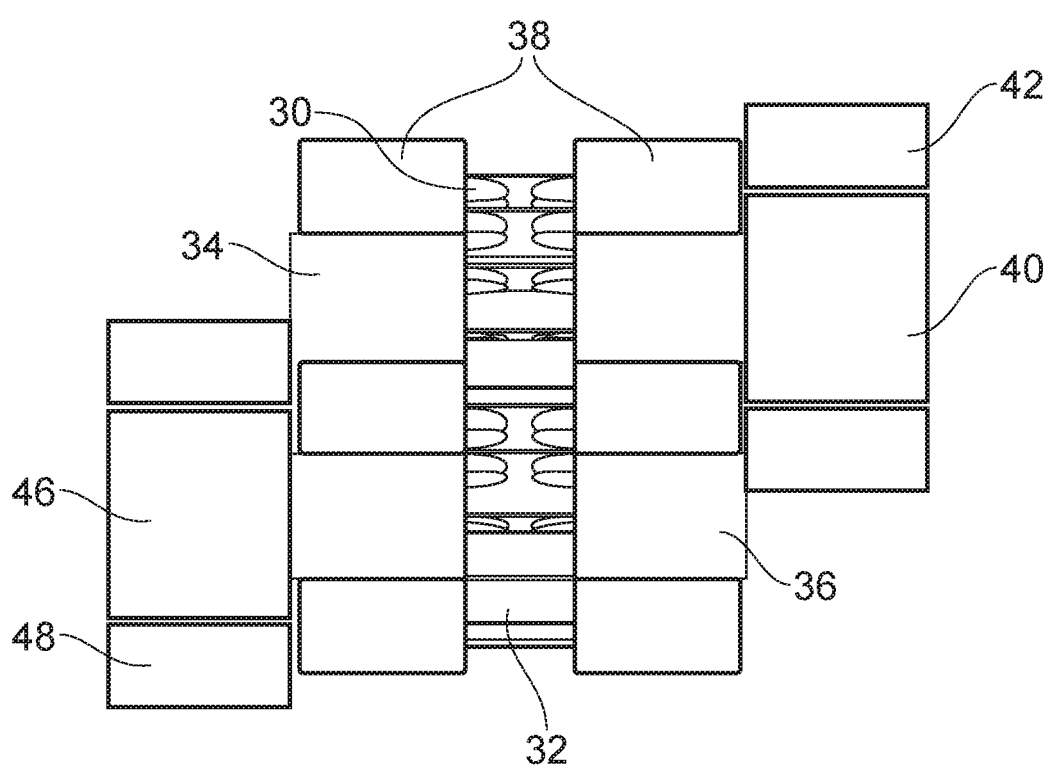
FIG. 5 shows schematically a cross-section of a variant twin pinion gear pump having a different motor arrangement.

FIG. 5 shows schematically a cross-section of a variant twin pinion gear pump. In the variant, the two electrical motors are on opposite sides of the meshing pinion gears 30, 32. The stators 42, 48 are thus formed as separate bodies which fully surround the rotors. Such a variant can allow the diameters of the motors to be increased, thereby enabling an increase in power from the motors.

While the invention has been described in conjunction with the exemplary embodiments described above, many equivalent modifications and variations will be apparent to those skilled in the art when given this disclosure. For example, although descried above in relation to a high pressure pump of an aero-engine fuel pumping unit, the pump may have other applications, particularly where fault tolerance is advantageous. Thus the pump may be used for oil pumping and/or in non-aerospace applications. Moreover, the electrical motors described above are switched reluctance motors, but types of motor may be used, such as permanent magnet or induction type. Accordingly, the exemplary embodiments of the invention set forth above are considered to be illustrative and not limiting. Various changes to the described embodiments may be made without departing from the spirit and scope of the invention.

The invention claimed is:

1. A fuel pumping unit for an aero-engine, the fuel pumping unit having a low pressure pump and a high pressure pump, the low pressure pump supplying fuel at a raised pressure to the high pressure pump for onward supply to a fuel metering unit of the aero-engine, the high pressure pump having:
    first and second meshing gears for pumping a fuel;
    a first electrical motor having a first rotor, a first stator and first coil windings; and
    a second electrical motor having a second rotor, a second stator and second coil windings;
    wherein the first rotor is operatively connected to the first gear and the second rotor is operatively connected to the second gear such that each gear is rotated by its respective rotor;
    wherein the first and second coil windings are energised by respective and separate first and second electrical power circuits such that the first and second meshing gears can be driven independently of each other;
    wherein the first rotor and the first gear are mounted, axially spaced from each other, on a first gear shaft, and the second rotor and the second gear are mounted, axially spaced from each other, on a second gear shaft; and
    wherein the pump is configured such that the electrical motors are cooled by a cooling flow formed from a flow of the pumped fuel and the electrical motors are fully immersed in the fuel.

2. The fuel pumping unit according to claim 1, wherein the first and second electrical power circuits each include a respective variable frequency motor drive.

3. The fuel pumping unit according to claim 1, further having a control unit which controls the power provided by the first and second electrical power circuits to run the pump at different speeds.

4. The fuel pumping unit according to claim 3, wherein the control unit further varies the relative amounts of power provided by the circuits so that varying amounts of mechanical power can be transferred between the gears.

5. The fuel pumping unit according to claim 3, wherein the control unit further compares the power provided by the circuits with a reference power characteristic to monitor the health of the pump.

6. The aero-engine having the fuel pumping unit according to claim 1.

* * * * *